United States Patent
Aoyama

(10) Patent No.: US 7,610,987 B2
(45) Date of Patent: Nov. 3, 2009

(54) POWER UNIT AND SADDLE-RIDE TYPE VEHICLE PROVIDED WITH THE POWER UNIT

(75) Inventor: Atsushi Aoyama, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 371 days.

(21) Appl. No.: 11/478,847

(22) Filed: Jun. 30, 2006

(65) Prior Publication Data

US 2007/0023219 A1 Feb. 1, 2007

(30) Foreign Application Priority Data

Jul. 4, 2005 (JP) ............................. 2005-194748

(51) Int. Cl.
*B60K 17/00* (2006.01)

(52) U.S. Cl. ..................................... 180/374; 180/220

(58) Field of Classification Search ............... 74/606 R; 180/220, 312, 346, 357, 366, 374–382; 474/8–46
See application file for complete search history.

(56) References Cited

U.S. PATENT DOCUMENTS

| | | | | |
|---|---|---|---|---|
| 4,344,500 A | * | 8/1982 | Kurata et al. ................ | 180/230 |
| 4,531,928 A | * | 7/1985 | Ikenoya ........................ | 474/93 |
| 4,666,015 A | * | 5/1987 | Matsuda et al. .............. | 180/233 |
| 4,901,813 A | * | 2/1990 | Kimura et al. ............... | 180/230 |
| 4,974,693 A | * | 12/1990 | Nakai et al. ................. | 180/19.3 |
| 5,094,315 A | * | 3/1992 | Taki et al. .................... | 180/219 |
| 5,101,924 A | * | 4/1992 | Yamagiwa et al. ........... | 180/220 |
| 5,152,361 A | * | 10/1992 | Hasegawa et al. ............ | 180/230 |
| 5,282,400 A | * | 2/1994 | Kobayashi et al. ............ | 477/37 |
| 5,406,154 A | * | 4/1995 | Kawaguchi et al. ......... | 310/67 R |
| 5,845,618 A | * | 12/1998 | Taue et al. ................... | 123/317 |
| 6,073,719 A | * | 6/2000 | Ohmika et al. .............. | 180/219 |
| 6,109,383 A | * | 8/2000 | Matsuto et al. .............. | 180/220 |
| 6,158,543 A | * | 12/2000 | Matsuto et al. .............. | 180/220 |
| 6,182,784 B1 | * | 2/2001 | Pestotnik ..................... | 180/376 |
| 6,267,700 B1 | * | 7/2001 | Takayama .................... | 474/93 |
| 6,276,481 B1 | * | 8/2001 | Matsuto et al. .............. | 180/220 |
| 6,349,785 B1 | * | 2/2002 | Ohmika et al. .............. | 180/227 |
| 6,405,821 B2 | * | 6/2002 | Tsutsumikoshi ............ | 180/226 |
| 6,427,796 B1 | * | 8/2002 | Tsutsumikoshi ............ | 180/227 |
| 6,454,040 B1 | * | 9/2002 | Fukuda ....................... | 180/374 |
| 6,481,408 B2 | * | 11/2002 | Tsutsumikoshi ........ | 123/195 R |
| 6,499,784 B2 | * | 12/2002 | Takahashi ................... | 296/37.1 |
| 6,513,613 B2 | * | 2/2003 | Suzuki et al. ............... | 180/227 |
| 6,547,023 B2 | * | 4/2003 | Laimbock ................... | 180/227 |
| 6,557,516 B2 | * | 5/2003 | Tsutsumikoshi ........ | 123/196 R |
| 6,591,934 B2 | * | 7/2003 | Tsutsumikoshi ............ | 180/291 |
| 6,612,391 B2 | * | 9/2003 | Yamauchi .................... | 180/292 |
| 6,615,945 B2 | * | 9/2003 | Minami et al. .............. | 180/219 |

(Continued)

FOREIGN PATENT DOCUMENTS

JP 2002-221138 8/2002

*Primary Examiner*—Paul N Dickson
*Assistant Examiner*—Laura Freedman
(74) *Attorney, Agent, or Firm*—Hogan & Hartson LLP

(57) ABSTRACT

A power unit in a saddle-ride type vehicle in which an arrangement space of an engine constituent part is ensured in an upper space of an engine body. In the power unit, an engine body having a crankshaft and a transmission casing accommodating therein a V-belt type transmission are joined. An oil reservoir portion is formed on a bottom of the engine body to project downward from a lower edge of the transmission casing, and a starter motor is arranged adjacent to a rear wall of the oil reservoir portion.

13 Claims, 9 Drawing Sheets

U.S. PATENT DOCUMENTS

| | | | |
|---|---|---|---|
| 6,651,767 B2 * | 11/2003 | Izawa et al. | 180/219 |
| 6,758,296 B2 * | 7/2004 | Inaoka et al. | 180/228 |
| 6,845,836 B2 * | 1/2005 | Inaoka et al. | 180/228 |
| 6,889,788 B2 * | 5/2005 | Hakamata et al. | 180/219 |
| 6,896,087 B2 * | 5/2005 | Korenjak et al. | 180/292 |
| 6,986,400 B2 * | 1/2006 | Osada | 180/228 |
| 7,004,276 B2 * | 2/2006 | Iizuka et al. | 180/89.17 |
| 7,101,311 B2 * | 9/2006 | Deguchi | 477/98 |
| 7,163,074 B2 * | 1/2007 | Inomori et al. | 180/219 |
| 7,243,564 B2 * | 7/2007 | Chonan et al. | 74/329 |
| 7,287,621 B2 * | 10/2007 | Kuroki et al. | 180/374 |
| 7,316,626 B2 * | 1/2008 | Oishi et al. | 474/144 |
| 2002/0032088 A1 * | 3/2002 | Korenjak et al. | 474/14 |
| 2002/0139596 A1 * | 10/2002 | Yagisawa et al. | 180/219 |
| 2003/0132837 A1 * | 7/2003 | Hasegawa et al. | 340/440 |
| 2004/0224806 A1 * | 11/2004 | Chonan | 474/93 |
| 2005/0014583 A1 * | 1/2005 | Morii et al. | 474/14 |
| 2005/0107194 A1 * | 5/2005 | Oishi et al. | 474/28 |
| 2005/0221927 A1 * | 10/2005 | Chonan | 474/15 |
| 2005/0255948 A1 * | 11/2005 | Chonan | 474/23 |
| 2007/0026982 A1 * | 2/2007 | Aoyama | 474/14 |
| 2008/0121454 A1 * | 5/2008 | Oishi et al. | 180/219 |

* cited by examiner

POWER UNIT AND SADDLE-RIDE TYPE VEHICLE PROVIDED WITH THE POWER UNIT

BACKGROUND OF THE INVENTION

1. Field of the Invention

The present invention relates to a power unit, in which an engine body having a crankshaft and a transmission casing accommodating therein a V-belt type transmission are joined integrally, and a saddle-ride type vehicle provided with the power unit.

2. Description of Related Art

Scooter type motorcycles generally have mounted thereon a unit swing type power unit, in which an engine body and a transmission casing accommodating therein a continuously variable transmission mechanism are joined integrally.

In such power units, an intake system such as a throttle body and an air cleaner and a starter motor for rotationally driving a crankshaft are conventionally arranged in an upper space of an engine body (see, for example, JP-A-2002-221138).

In the case where an intake system and a starter motor are arranged in an upper space of an engine body as in the conventional power unit described above, there is a problem in that the upper space of the engine body is occupied by such parts and there is less space in which other engine constituent parts can be arranged. In particular, the latest scooter type motorcycles mount, in some cases, an ECVT, which automatically and variably controls a belt wound diameter of a continuously variable transmission on the basis of engine speed, etc., and space must be ensured for engine constituent parts such as ECVT to be arranged.

SUMMARY OF THE INVENTION

The invention has been thought of in view of the conventional situation described above and has as its object to provide a power unit capable of ensuring a space, in which engine constituent parts are arranged, in an upper space of an engine body, and a saddle-ride type vehicle provided with the power unit.

The invention provides a power unit, in which an engine body having a crankshaft and a transmission casing accommodating therein a V-belt type transmission are joined. The power unit is characterized in that an oil reservoir portion is formed on a bottom of the engine body to project downward from a lower edge of the transmission casing and an electric motor is arranged adjacent to a side wall of the oil reservoir portion.

In the power unit according to the invention, the oil reservoir portion is formed on the bottom of the engine body to project downward from the lower edge of the transmission casing and the electric motor is arranged adjacent to the side wall of the oil reservoir portion, so that the electric motor will be arranged in an empty space on the side wall of the oil reservoir portion and a margin is provided in an upper space of the engine body to enable arranging of other engine constituent parts in the upper space.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
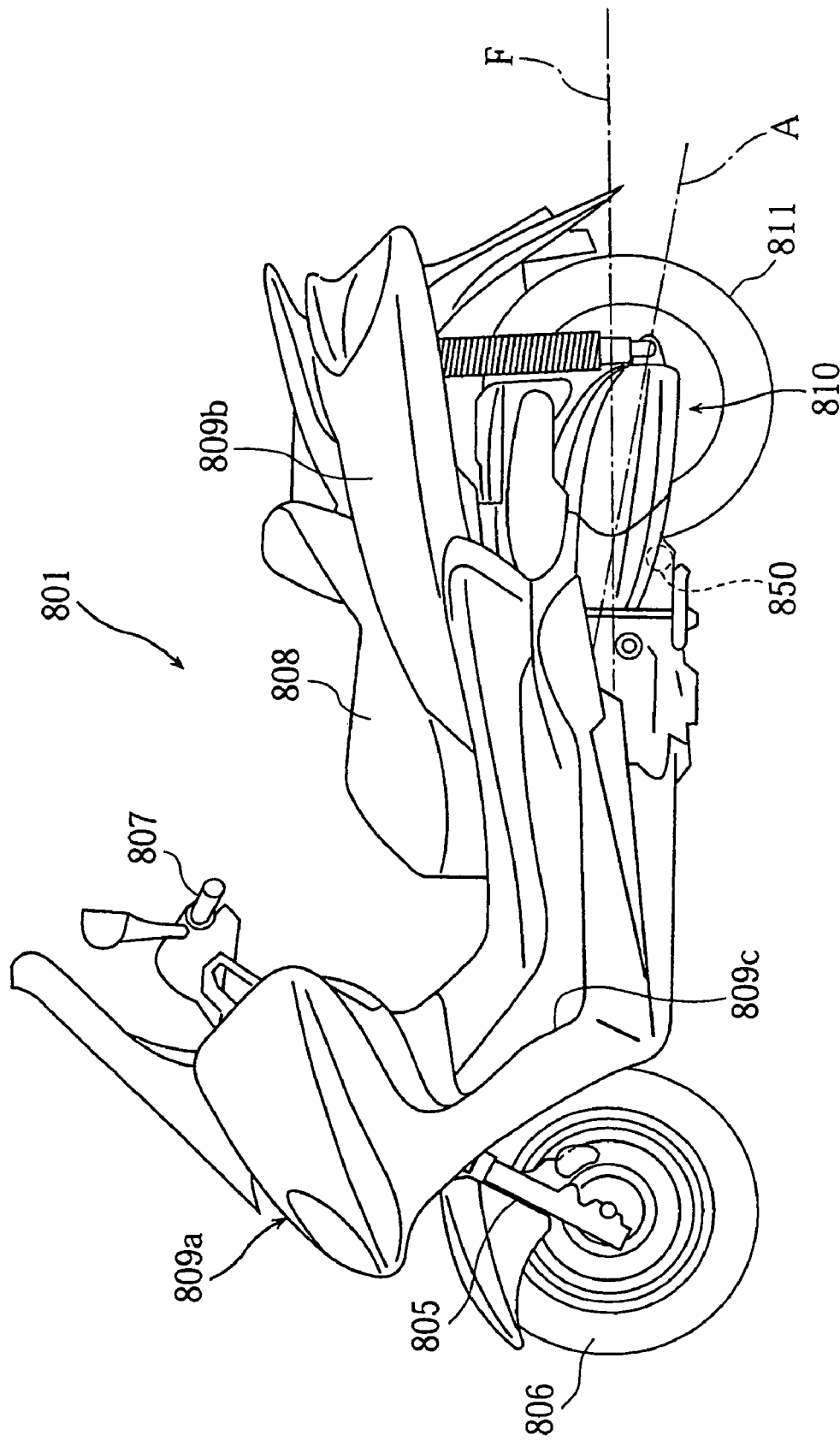
FIG. 1 is a side view showing a scooter type motorcycle provided with a power unit according to an embodiment of the invention.
Figure 2:
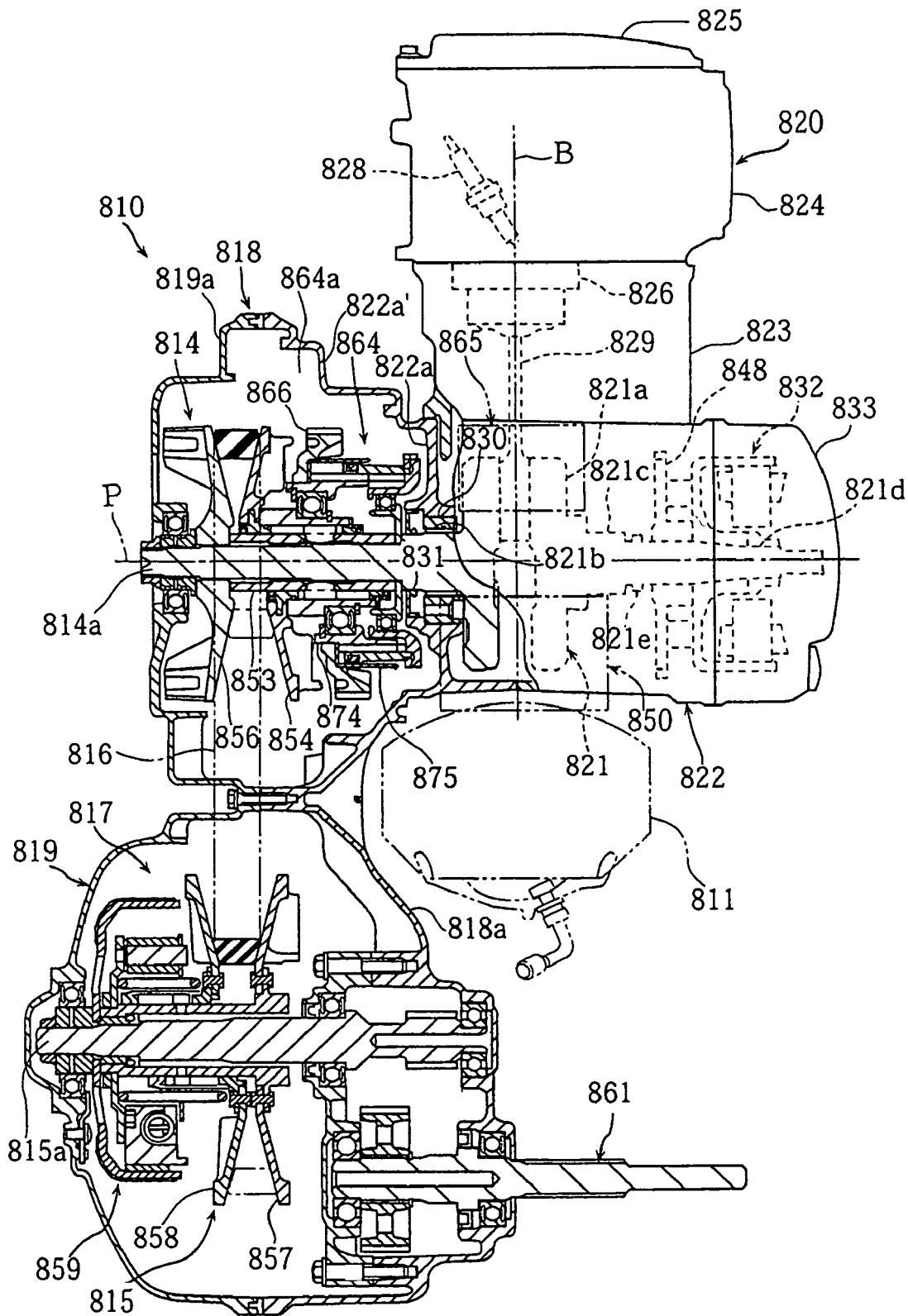
FIG. 2 is a plan view showing the power unit in partial cross section.
Figure 3:
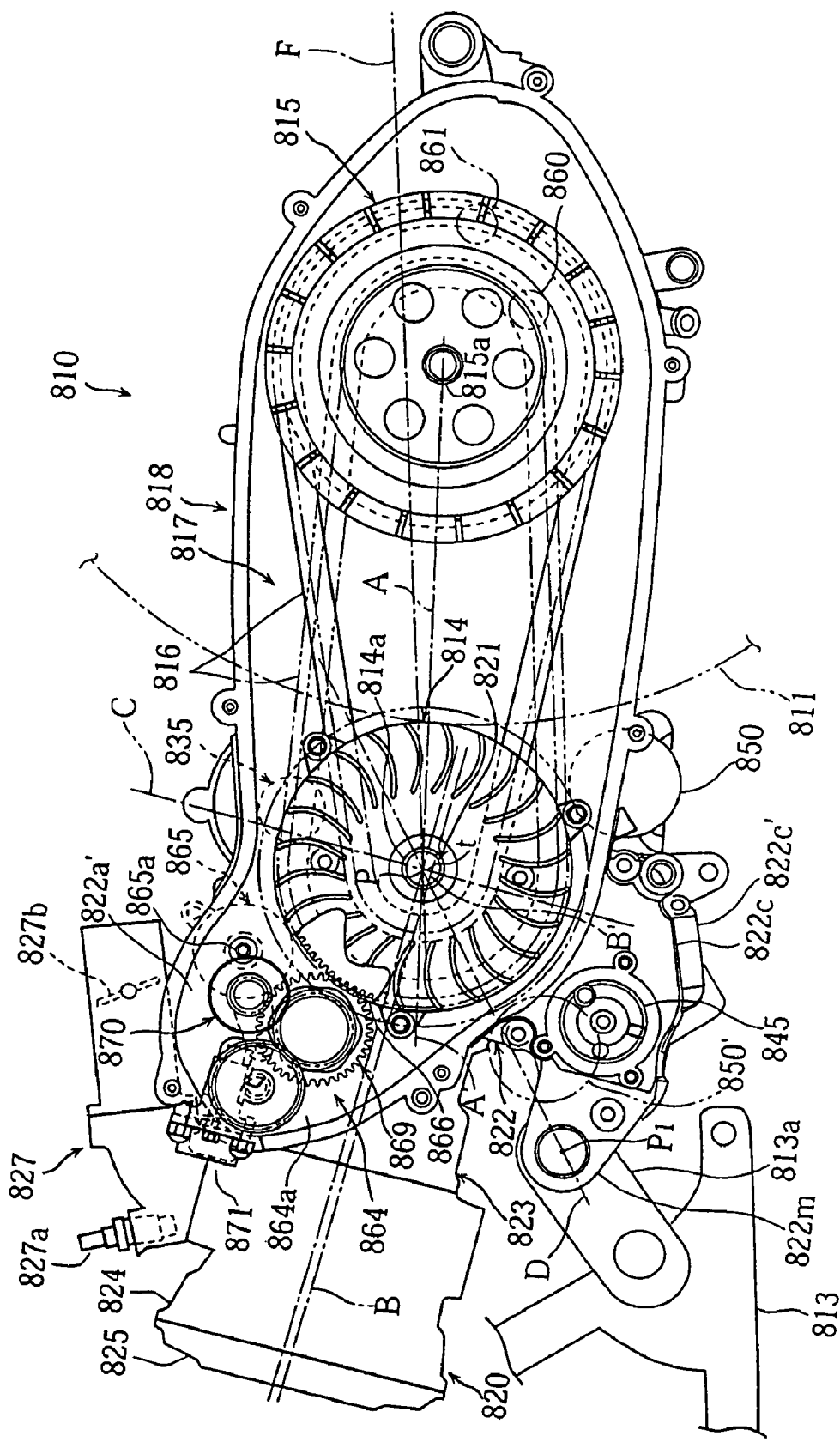
FIG. 3 is a side view showing the power unit in a state, in which a casing cover is removed.
Figure 4:
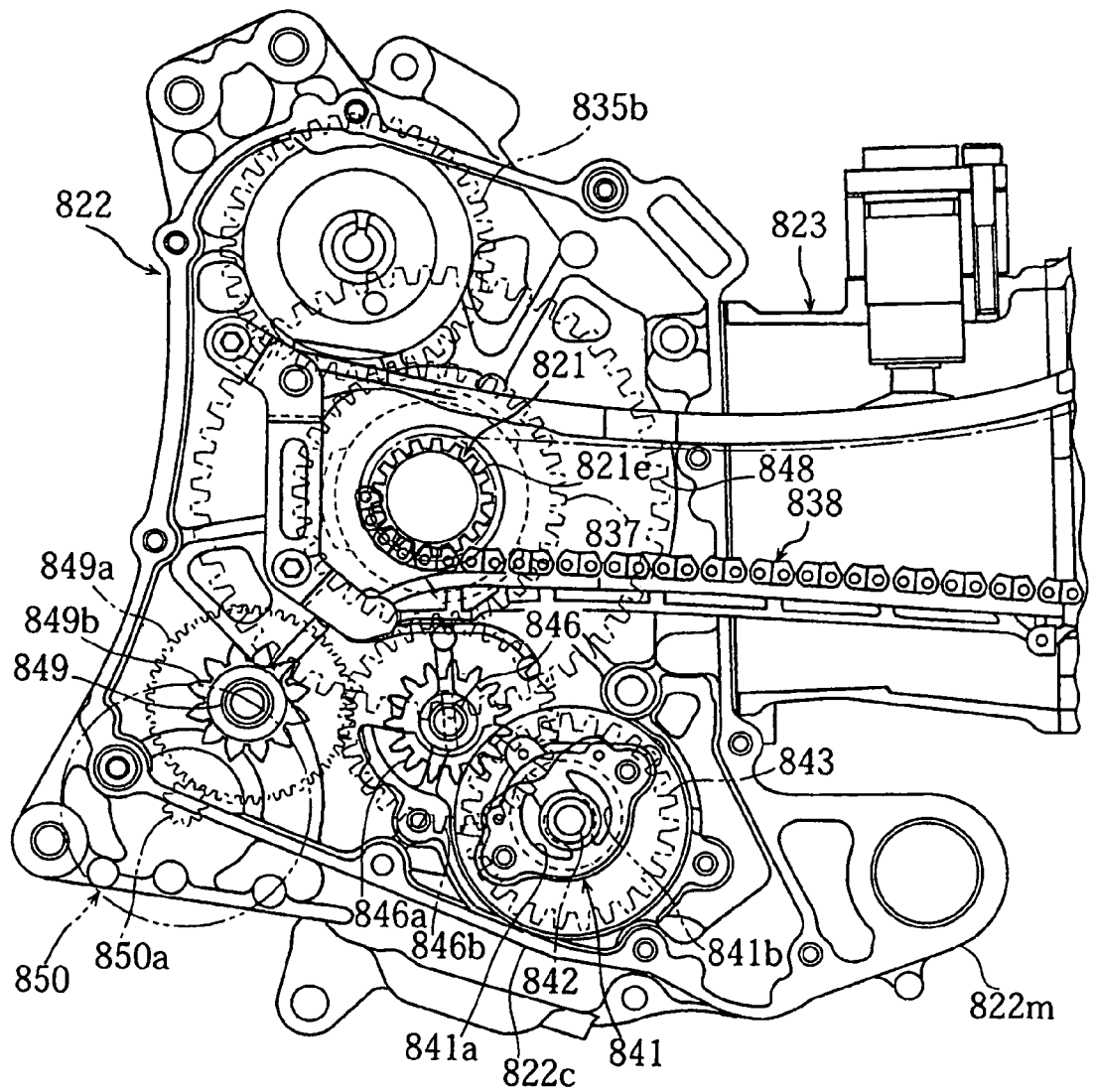
FIG. 4 is a right side view showing an engine body of the power unit.
Figure 5:
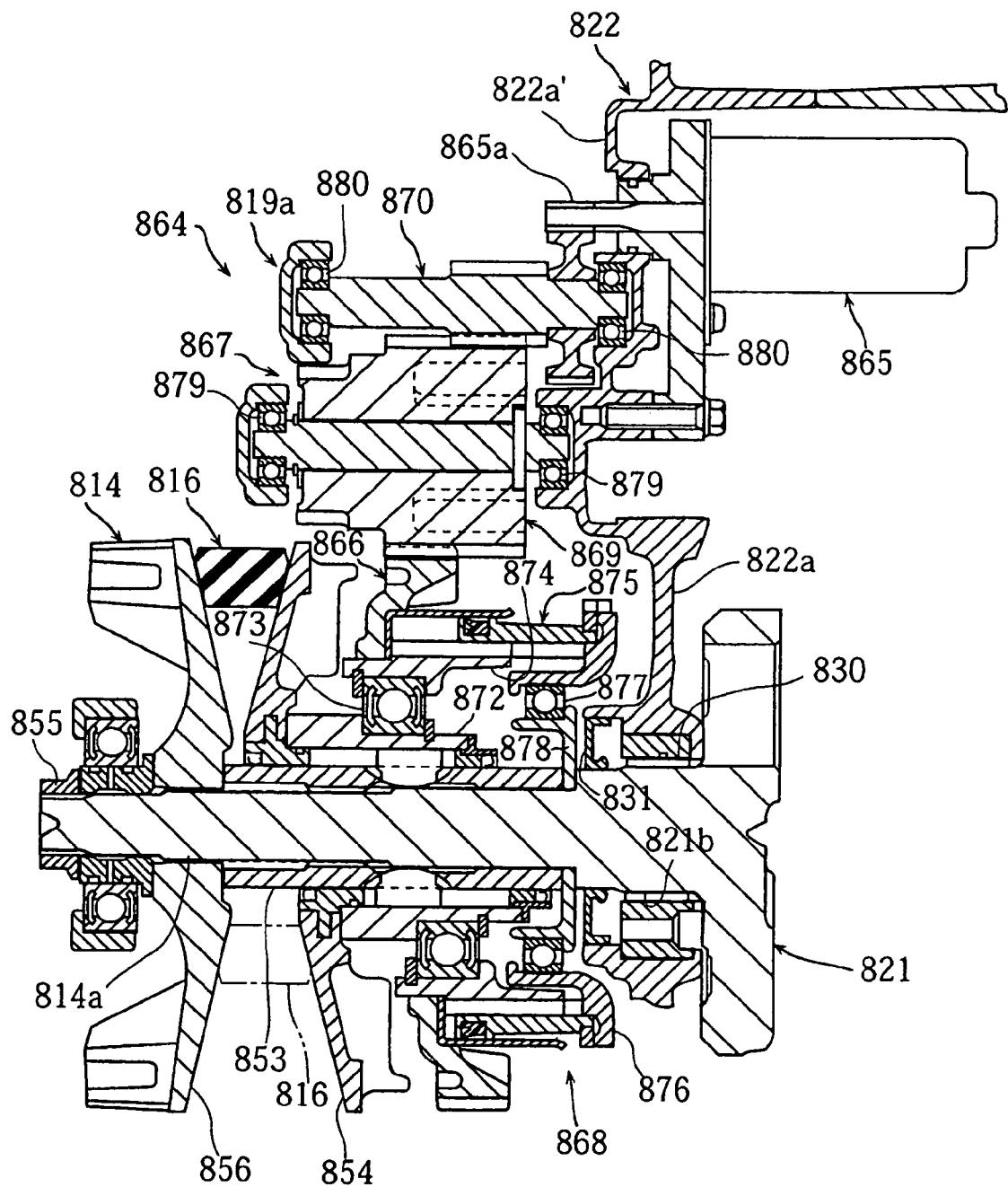
FIG. 5 is a cross sectional view showing a continuously variable transmission mechanism of the power unit.
Figure 6:
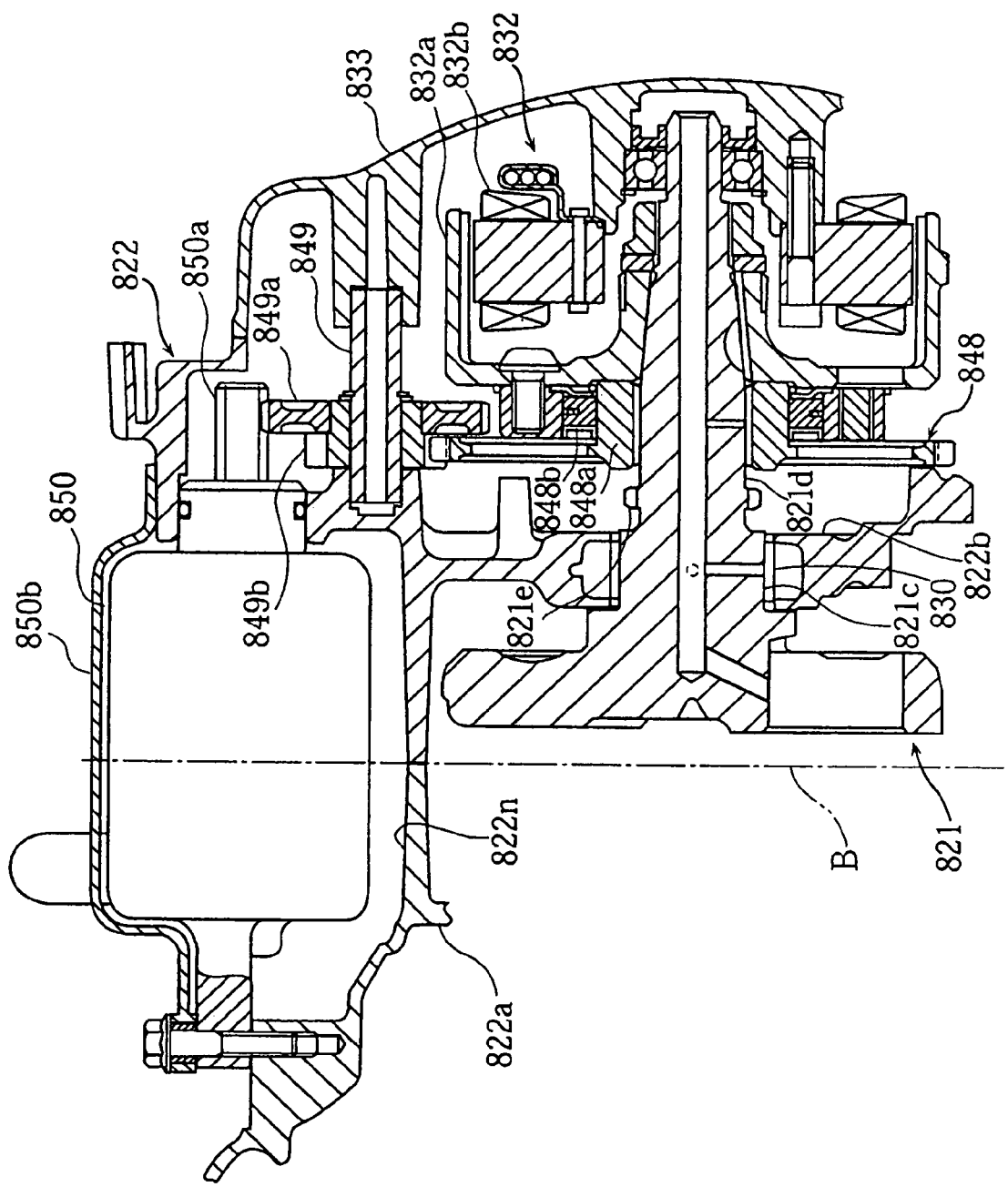
FIG. 6 is a cross sectional view showing a starter motor portion of the power unit.
Figure 7:
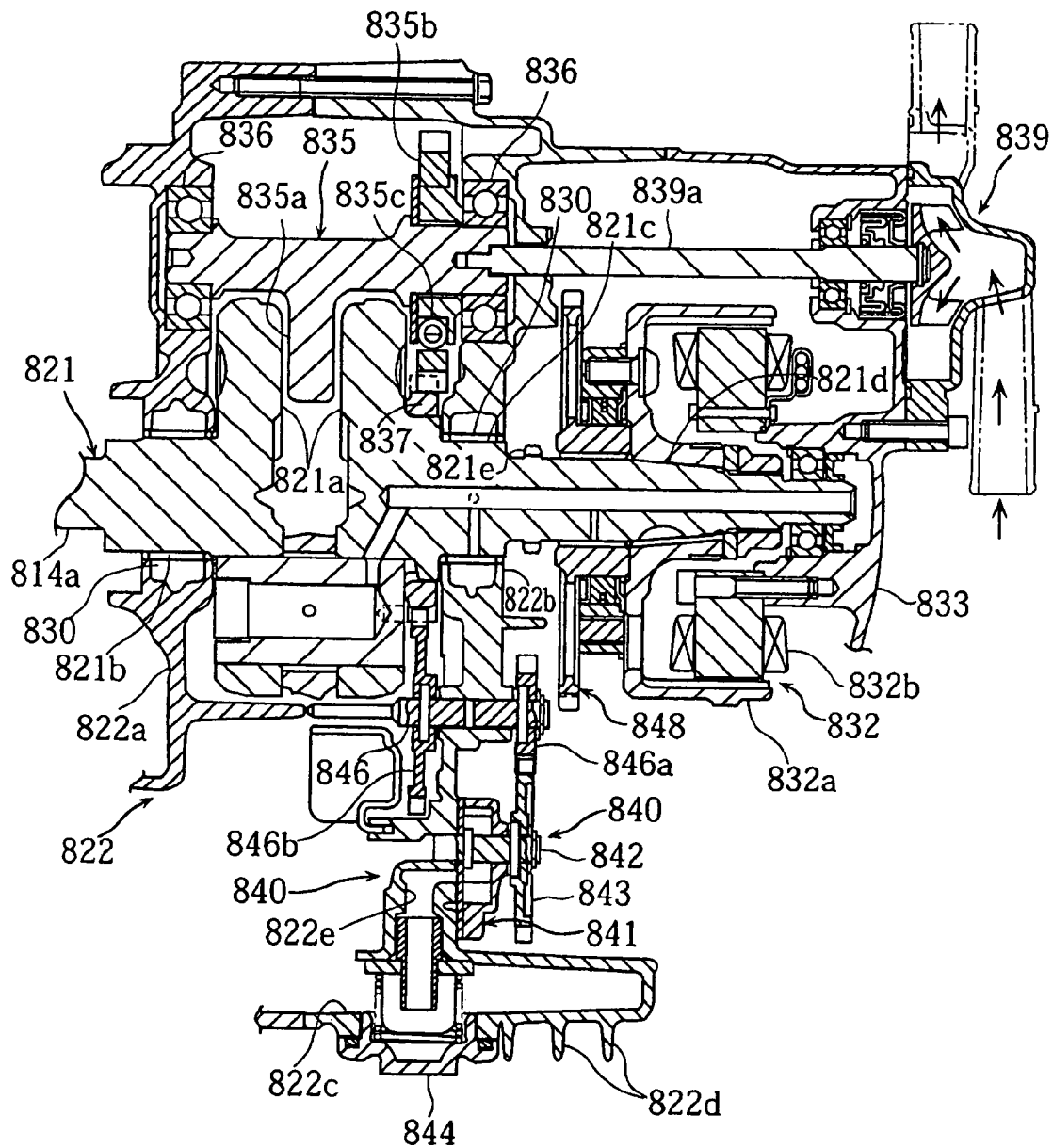
FIG. 7 is a cross sectional view showing a primary balancer and an oil pump drive unit of the power unit.
Figure 8:
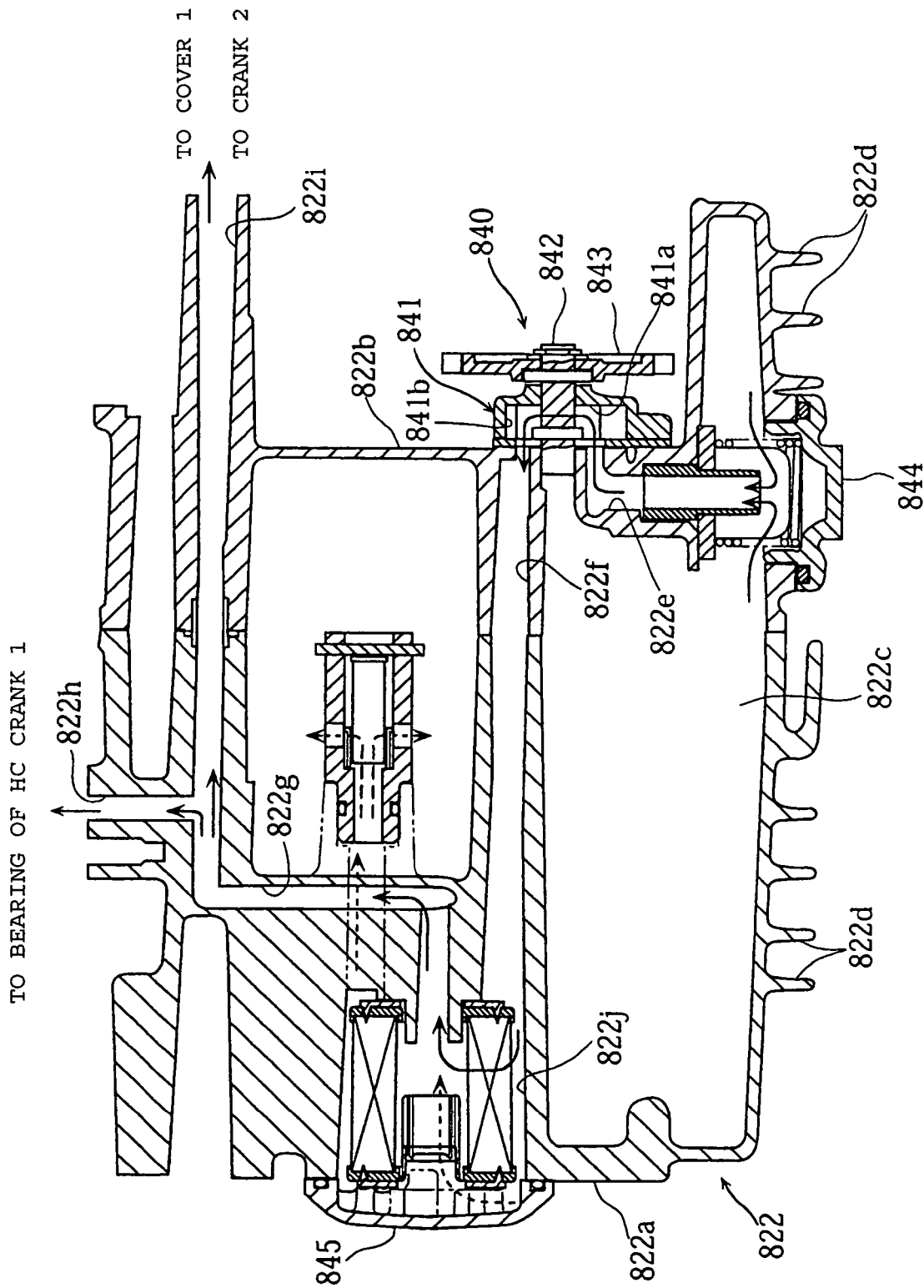
FIG. 8 is a cross sectional view showing an oil reservoir portion of the power unit.

An embodiment of the invention will be described below with reference to the accompanying drawings.

FIGS. 1 to 9 are views illustrating a power unit according to an embodiment of the invention and a saddle-ride type vehicle provided with the power unit. The embodiment will be described with respect to the case of a power unit mounted on a scooter type motorcycle. In addition, front and rear, and left and right referred to in the embodiment mean front and rear, and left and right in a state of being seated on a seat. Also, a vertical direction referred to in the embodiment means a direction perpendicular to a road surface.

In the drawings, the reference numeral 801 denotes a scooter type motorcycle having the following schematic construction. A front fork 805 is pivotally mounted on a head pipe of an underbone type vehicle body frame (not shown), the front fork 805 arranging a front wheel 806 at a lower end thereof and a steering handle 807 at an upper end thereof. Also, a saddle-ride type seat 808 for two is mounted centrally of the vehicle body frame, a unit swing type power unit 810 is mounted below the seat 808 of the vehicle body frame to be able to swing vertically, and a rear wheel 811 is arranged on a rear end of the power unit 810.

A periphery of the front fork 805 is covered by a front cover 809a, and a periphery of a lower portion of the seat 808 is covered by a side cover 809b. Left and right step boards 809c, 809c are arranged between the front cover 809a and the side cover 809b.

The power unit 810 is constructed to integrally join a transmission casing 818 accommodating therein a V-belt type continuously variable transmission mechanism 817, in which a V-belt 816 made of rubber or a resin is wound around a drive side sheave 814 and a driven side sheave 815, and an engine body 820 having a cylinder body, for which an angle θ formed between a virtual plane A', which includes a straight line A connecting between a driven shaft 815a of the driven side sheave 815 and a drive shaft 814a of the drive side sheave 814, and a cylinder axis (cylinder axis) B is equal to or less than 45 degrees, and about 10 degrees in the embodiment. The transmission casing 818 is arranged on the left of the engine body 820.

The engine body 820 is a water-cooled type 4-cycle single cylinder engine constructed such that joined to a front mating surface of a crankcase 822, in which a crankshaft 821 is accommodated, are a cylinder block 823 with a piston 826 slidably received therein and a cylinder head 824, in which an ignition plug 828, intake and exhaust valves, and a camshaft (not shown) for drivingly opening and closing the respective valves, are arranged, and mounted to the cylinder head 824 is a head cover 825.

A pair of left and right pivots 822m, 822m are forwardly and protrusively formed on the crankcase 822. The left and right pivots 822m are supported on an engine suspension 813 of the vehicle body frame described above through a link member 813a to be able to swing vertically.

The left and right pivots 822m are formed on a front wall portion of an oil reservoir portion 822c of a crankcase 822 described later to extend substantially in parallel to the cylinder axis B. Also, the left and right pivots 822m are arranged below a lower surface of the cylinder block 823 and forwardly downwardly of the crankshaft 821 as viewed in a direction along the crankshaft.

An intake pipe 827 communicated to an intake port is connected to an upper wall portion 824a of the cylinder head 824, the intake pipe 827 being bent and extended toward a vehicle rear part from the upper wall portion 824a. A fuel injection valve 827a is mounted to a downstream end of the intake pipe 827 and a throttle valve 827b is arranged on an upstream side thereof. An air cleaner (not shown) is connected to an upstream end of the intake pipe 827.

The crankshaft 821 is arranged with a crank axis P thereof directed horizontally in a vehicle width direction, and the piston 826 is connected to the crankshaft 821 through a connecting rod 829.

Left and right journal portions 821b, 821c of the crankshaft 821 are supported through bearings 830, 830 on left and right side walls 822a, 822b of the crankcase 822. A sealing member 831 is mounted between the left journal portion 821b and the left side wall 822a, whereby the crankcase 822 filled with a lubricating oil and the transmission casing 818, into which a traveling wind is introduced, are compartmented from each other.

A right drive shaft 821d projecting outward from the right side wall 822b is formed integral with the right journal portion 821c of the crankshaft 821.

An electric generator 832 is mounted at an outer end of the right drive shaft 821d, the electric generator 832 being covered by a cover 833 mounted on the right side wall 822b. The electric generator 832 comprises a rotor 832a taper-fitted onto the crankshaft 821 and a stator 832b fixed to the cover 833 in a manner to be opposed to the rotor 832a.

The left drive shaft 814a, described above, projecting into the transmission casing 818 from the left side wall 822a is formed integral with the left journal portion 821b of the crankshaft 821. The drive side sheave 814 is mounted on the drive shaft 814a.

A primary balancer 835 for suppression of vibrations caused by a primary inertial force is arranged in the crankcase 822 to be made in parallel to the crankshaft 821. Formed on the primary balancer 835 is a balancer weight 835a extending to be positioned between left and right crank arms 821a of the crankshaft 821. The primary balancer 835 is arranged above a virtual horizontal plane F, which includes a crank axis P of the crankshaft 821.

The balancer 835 is supported on the left and right side walls 822a, 822b with bearings 836, 836 therebetween, and a balancer gear 835b is mounted on a right end of the balancer 835 with a damper member 835c therebetween.

A drive gear 837 meshing with the balancer gear 835b is mounted inside the right journal portion 821c of the crankshaft 821.

Also, a timing chain drive gear 821e is formed integrally outside the right journal portion 821c. The drive gear 821e is connected to the camshaft (not shown) through a timing chain 838.

A pump shaft 839a for cooling water is connected coaxially to the balancer 835. The pump shaft 839a rotationally drives a cooling water pump 839 arranged on an outer wall of the cover 833. Cooling water pressurized by the cooling water pump 839 is supplied to respective cooling water jackets (not shown) of the engine body 820.

The transmission casing 818 comprises a casing body 818a formed integrally to be made contiguous to the left side wall 822a of the crankcase 822 and extend to the rear wheel 811, and a casing cover 819 mounted detachably on a left mating surface of the casing body 818a. A cooling wind introduction cover (not shown) is mounted to an outside of the casing cover 819 to introduce a traveling wind into the transmission casing 818.

The drive side sheave 814 comprises a collar member 853 spline-fitted onto the drive shaft 814a to rotate therewith, a moving sheave 854 mounted on the collar member 853 to be made axially movable and to rotate with the collar member 853, and a stationary sheave 856 mounted on the drive shaft 814a to abut against a left end surface of the collar member 853 and fixed by a lock nut 855 to be made axially immovable.

The driven side sheave 815 comprises a stationary sheave 857 mounted rotatably and axially immovably on the driven shaft 815a, which is journalled bridging the casing body 818a and the casing cover 819, a moving sheave 858 mounted on the stationary sheave 857 to be made axially movable and to rotate with the stationary sheave 857, and a centrifugal type clutch 859 interposed between the stationary sheave 857 and the driven shaft 815a. The centrifugal type clutch 859 transmits rotation of the driven side sheave 815 to the driven shaft 815a when the driven side sheave 815 is increased in rotational speed. Rotation of the driven shaft 815a is transmitted to the rear wheel 811, which is mounted on a drive shaft 861, via a main shaft 860 and the drive shaft 861, which are arranged in parallel to the driven shaft 815a.

The continuously variable transmission mechanism 817 comprises a wound diameter varying mechanism 864 that varies a belt wound diameter of the drive side sheave 814 on the basis of engine speed and vehicle speed, the wound diameter varying mechanism 864 being arranged in a wound diameter control chamber 864a expanded and formed obliquely upward at a front end of the transmission casing 818.

The wound diameter varying mechanism 864 is constructed to transmit rotation of an ECVT motor (control motor) 865 to a gear train and a reciprocation gear (power transmission gear) 866 to convert the same into axial movements of the moving sheave 854 of the drive side sheave 814, thereby automatically and variably controlling a belt wound diameter of the drive side sheave 814 between a low position and a top position. Rotation of the ECVT motor 865 is controlled on the basis of engine speed, vehicle speed, etc. by a controller (not shown).

The wound diameter varying mechanism 864 comprises the ECVT motor 865, a rotation transmission gear portion 867, which transmits rotation of the ECVT motor 865 to the reciprocation gear 866, and an axial movement conversion portion 868, which converts rotation of the reciprocation gear 866 into axial movements of the moving sheave 854.

The ECVT motor 865 is arranged on a front portion of an upper surface of the crankcase 822 to be disposed above a virtual horizontal plane F, which includes the crank axis P, with a motor axis thereof directed in parallel to the crankshaft 821. More specifically, the ECVT motor 865 is mounted and fixed to an extension 822a' of a left wall 822a, which defines the wound diameter control chamber 864a, from inward in the vehicle width direction. A rotary gear 865a of the ECVT motor 865 extends through the extension 822a' to project into the wound diameter control chamber 864a.

As viewed from laterally of the vehicle, the ECVT motor 865 is covered by the extension 822a' and arranged between the upper surface of the crankcase 822 and the intake pipe 827.

The rotation transmission gear portion 867 comprises the reciprocation gear 866, a motor side gear 869, which meshes with the reciprocation gear 866, and a reduction gear 870, which reduces rotation of the ECVT motor 865 in speed to transmit the same to the motor side gear 869, and the rotary gear 865a of the ECVT motor 865 meshes with the reduction gear 870. Here, the reference numeral 871 denotes a rotational frequency sensor, and a state of rotation of the ECVT motor 865 and hence an axially moved position of the moving sheave 854 are detected by the rotational frequency sensor 871.

The motor side gear 869 and the reduction gear 870, respectively, are supported through bearings 879, 880 on the extension 822a' of the left side wall 822a and an extension 819a of the casing cover 819.

The axial movement conversion portion 868 comprises a slide cylindrical body 872 mounted on the moving sheave 854, a moving side feed screw member 874 supported rotatably through a bearing 873 by the slide cylindrical body 872 and having the reciprocation gear 866 fixed thereto, and a stationary side feed screw member 875 meshing with the moving side feed screw member 874 and latched on the left side wall 822a.

The stationary side feed screw member 875 is supported by a stationary side support member 876, which is bolted and fixed to the left side wall 822a. A centering bearing 877 is interposed between the stationary side support member 876 and a bearing support member 878 fixed to the drive shaft 814a.

When an engine speed increases keeping with an accelerator opening operation, rotation of the ECVT motor 865 is controlled to present a preset belt wound diameter according to the engine speed, etc. Rotation of the rotary gear 856a of the ECVT motor 865 is transmitted to the reciprocation gear 866 from the reduction gear 870 and the motor side gear 869. When the reciprocation gear 866 rotates, the moving side feed screw member 874 together with the reciprocation gear 866 axially moves a distance corresponding to an amount of rotation of the ECVT motor 865. In keeping with this, the moving sheave 854 moves a predetermined amount toward a top side, so that the drive side sheave 814 attains the set belt wound diameter.

The oil reservoir portion 822c is formed on a bottom of the crankcase 822. The oil reservoir portion 822c is expanded and formed to project downward from a lower edge of the transmission casing 818 and to tilt forwardly downward as it goes toward the front. Also, a plurality of cooling fins 822d are formed on an outer bottom surface of the oil reservoir portion 822c.

Arranged on the oil reservoir portion 822c is an oil pump 840 that supplies a lubricating oil to respective lubricated portions such as the crankshaft 821, a bearing portion of the camshaft, and slide portions. The oil pump 840 comprises a housing 841 including a suction port 841a and a discharge port 841b, which are arranged outside the right side wall 822b of the crankcase 822, a pump shaft 842 journaled by the housing 841 and the right side wall 822b, and a pump gear 843 fixed to an outer end of the pump shaft 842.

An intermediate shaft 846 is journaled between the pump shaft 842 on the right side wall 822b and the crankshaft 821. The intermediate shaft 846 fixes a small gear 846a, which meshes with the pump gear 843, to an outer end thereof and a large gear 846b, which meshes with the drive gear 837, to an inner end thereof. The drive gear 837 serves as a drive member common to the balancer 835 and the oil pump 840 and is arranged in the crankcase 822.

A suction passage 822e communicated to the suction port 841a is formed on the right side wall 822b, the suction passage 822e being opened to be made close to the bottom surface of the oil reservoir portion 822c. In addition, the reference numeral 844 denotes a drain plug.

Also, a discharge passage 822f communicated to the discharge port 841b is formed on the right side wall 822b, the discharge passage 822f being communicated to an oil filter 845. A lubricating oil pressurized by the oil pump 840 and filtered by the oil filter 845 branches into a crankshaft path 822h and a camshaft path 822i from a supply passage 822g to be supplied to the respective lubricated portions, and then naturally drops to return to the oil reservoir portion 822c.

The oil filter 845 is mounted detachably in a recess 822j, which is provided in a portion of the left side wall 822a facing the oil reservoir portion 822c, from laterally outward.

The oil filter 845 and the oil pump 840 are distributed and arranged left and right with the cylinder axis B therebetween as viewed in plan view, and arranged on substantially the same axis as viewed in the direction along the crankshaft.

Figure 9:
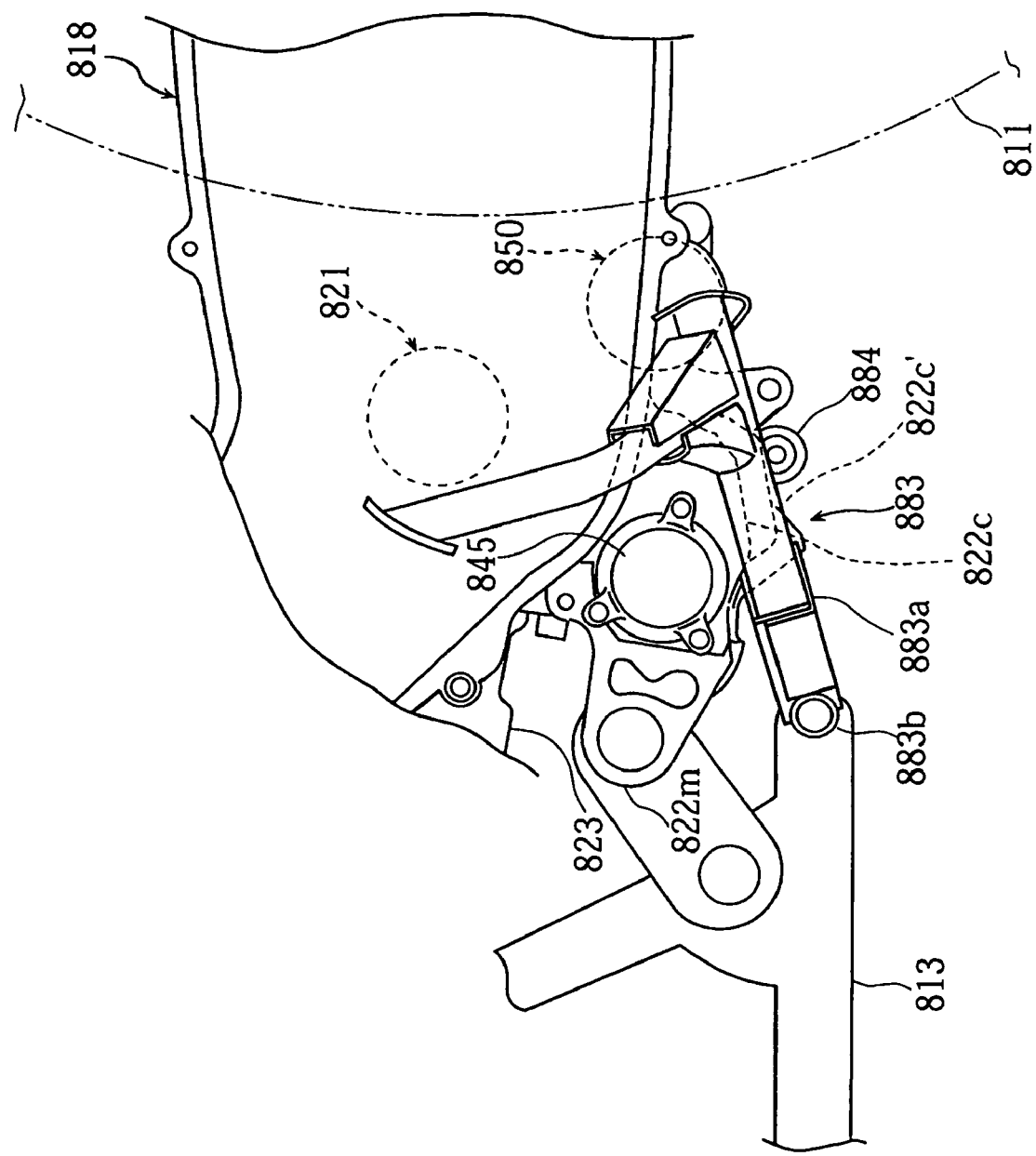
FIG. 9 is a side view showing a main stand put in a storage position and arranged on the power unit.

A main stand 883 is arranged on the engine suspension 813 as shown in FIG. 9. The main stand 883 is supported to be able to swing vertically between an upright position, in which the vehicle body is supported by the engine suspension 813, and a storage position, in which it abuts against a bottom surface of the power unit 810, and biased by a spring (not shown) in a direction of storage.

The main stand 883 is schematically constructed such that a pair of left and right leg portions 883a, 883a are joined together by a cross portion (not shown), and front ends 883b of the left and right leg portions 883a are supported on the engine suspension 813. Also, a cushioning member 884 made of rubber, etc. is mounted to the cross portion.

Formed on a bottom surface of the oil reservoir portion 822c is a stopper surface 822c', against which the cushioning member 884 of the main stand 883 abuts to thereby hold the main stand 883 in the storage position. The stopper surface 822c' is formed to be large in wall thickness in a manner to project downward from the bottom surface of the oil reservoir portion 822c and to tilt rearwardly upward so as to suppress that variation in height of the main stand 883 from a road surface, which is caused by variation in a vertical stroke of the rear wheel 811.

A starter gear 848 is mounted rotatably between the electric generator 832 on the right drive shaft 821d of the crankshaft 821 and the timing chain drive gear 821e. The rotor 832a of the electric generator 832 is fixed to a boss 848a of the starter gear 848 with a one-way clutch 848b therebetween.

A drive gear 850a of a starter motor 850 (electric motor) is connected to the starter gear 848 through an idler shaft 849. The idler shaft 849 is supported bridging the right side wall 822b and the cover 833 and comprises an idler large gear 849a, which meshes with the drive gear 850a, and an idler small gear 849b, which meshes with the starter gear 848.

Rotation of the starter motor 850 is transmitted to the starter gear 848 via the idler shaft 849 and transmitted to the crankshaft 821 via the rotor 832a from the starter gear 848.

The starter motor 850 is arranged on a lower portion of a back surface of the crankcase 822 with a motor axis thereof directed in parallel to the crankshaft 821. More specifically, the starter motor 850 is arranged in an accommodation recess 822n concavely provided on a rear wall portion of the oil reservoir portion 822c of the crankcase 822, and covered by a motor cover 850b.

The starter motor 850 is arranged between the oil reservoir portion 822c and an outer edge of the rear wheel 811.

Also, the starter motor 850 is arranged so that, as viewed from laterally, an upper half thereof is positioned above the lower edge of the transmission casing 818 and a lower edge of the starter motor 850 is positioned above a lowermost end surface of a lower edge of the oil reservoir portion 822c. Further, the starter motor 850 is arranged so that the lower edge is positioned above a lower end of the stopper surface 822c' of the oil reservoir portion 822c.

The power unit 810 is constructed so that a center line of the rear wheel 811 in the vehicle width direction is made consistent with a cylinder axis B, and mounted so as to be made consistent with a center line of a vehicle body frame 801.

Here, the cylinder block 823, the cylinder head 824, and the head cover 825 of the power unit 810 are arranged offset as viewed in the direction along the crankshaft so that a virtual plane B' including the cylinder axis B and being in parallel to crankshaft 821 passes through a position displaced t, specifically, around 5 to 7 mm, downward from the crank axis P.

The starter gear 848 is arranged on the right drive shaft 821d of the crankshaft 821 and the reciprocation gear (power transmission gear) 866 is arranged on the left drive shaft 814a of the crankshaft 821. In other words, the reciprocation gear 866 and the starter gear 848 are distributed and arranged left and right with the cylinder axis B of the crankshaft 821 therebetween.

The ECVT motor 865 and the starter motor 850, respectively, are arranged on the cylinder axis B as viewed in plan view and arranged above and below the crankshaft 821 as viewed in the direction along the crankshaft.

Also, the ECVT motor 865 and the starter motor 850, respectively, are arranged in the front and the rear of a virtual plane C, which includes the crank axis P and is perpendicular to the cylinder axis B, and arranged above and below a virtual plane D, which includes the crank axis P and an axis P1 of swinging of the pivots 822m, to be made symmetric with respect to the virtual plane D.

According to the embodiment, since the oil reservoir portion 822c projecting downward from the lower edge of the transmission casing 818 is formed on the bottom of the crankcase 822 and the starter motor 850 is arranged adjacent to the rear side wall of the oil reservoir portion 822c, a margin can be provided in an upper space of the engine body 820 by arranging the starter motor 850 making use of an empty space behind the oil reservoir portion 822c, so that it is possible to ensure a space, in which the ECVT motor 865 of the wound diameter varying mechanism 864 can be arranged, in the upper space. Thereby, it is possible to arrange the wound diameter varying mechanism 864 without oversizing of the power unit 810.

While being used only at the starting of an engine, the starter motor 850 is generally large in capacity. Effective use of the upper space of the engine body 820 can be made by arranging such starter motor 850 in the empty space behind the oil reservoir portion 822c. Also, since the starter motor 850 is not used after the starting of an engine, it does not need to take cooling, etc. into consideration so much and is easily arranged on the side wall of the oil reservoir portion 822c.

On the other hand, the oil reservoir portion 822c is relatively high in freedom of design for shape and can be accommodated in a compact manner even when the starter motor 850 is arranged adjacent thereto. In this case, while there is some fear of thermal influences due to a lubricating oil, a measure to heat in case of taking account of a cooling quality is easy since a construction of cooling the oil reservoir portion 822c can be applied. The starter motor 850 can be cooled simultaneously by, for example, causing a traveling wind at the time of traveling of a vehicle to strike against the oil reservoir portion 822c.

Also, since the oil reservoir portion 822c and the starter motor 850 are exposed downward from the lower edge of the transmission casing 818, the oil reservoir portion 822c and the starter motor 850 are easily cooled.

Further, by heightening the cooling quality of the oil reservoir portion 822c, it is possible to suppress temperature rise of the V-belt type continuously variable transmission mechanism 817 and hence to improve the V-belt 816 in durability.

According to the embodiment, since the starter motor 850 is arranged between the oil reservoir portion 822c and the outer edge of the rear wheel 811, the starter motor 850 makes effective use of an empty space generated between the oil reservoir portion 822c and the rear wheel 811.

According to the embodiment, since the starter motor 850 is arranged so that an upper half of the starter motor 850 is positioned above the lower edge of the transmission casing 818, the starter motor 850 makes effective use of an empty space generated between the crankcase 822 and the transmission casing 818.

Also, since the lower edge of the starter motor 850 is positioned above the lowermost end surface of the oil reservoir portion 822c, contact of the starter motor 850 with an outside is minimized. That is, the starter motor 850 is positioned above the lowermost end surface of the oil reservoir portion 822c, which is positioned at a lowest ground level, thereby avoiding contact with a road surface.

According to the embodiment, since the drive side sheave 814 is arranged on the left of the crankshaft 821 in the direction along the crankshaft and the starter gear 848 is arranged on the right in the direction along the crankshaft, weight balance on the left and the right of the crankshaft 821 is favorable.

According to the embodiment, since the ECVT motor 865 of the wound diameter varying mechanism 864 is arranged on the cylinder axis B and arranged above the transmission casing 818 and forwardly of the drive side sheave 814, the ECVT motor 865 can be arranged to make effective use of the upper space of the engine body 820, which is generated by arranging the starter motor 850 on the oil reservoir portion 822c. Thereby, oversizing of the power unit 810 caused by mounting of the wound diameter varying mechanism 864 is avoided.

According to the embodiment, since the ECVT motor 865 is arranged above the virtual horizontal plane F, which includes the crank axis P, it is favorable in weight balance relative to the starter motor 850, which is arranged below the virtual horizontal plane F.

Also, since the ECVT motor 865 and the starter motor 850, respectively, as viewed in the direction along the crankshaft, are arranged in the front and the rear of the virtual plane C, which includes the crank axis P and is perpendicular to the cylinder axis B, and arranged above and below the crankshaft 821, weight balance on the front and the rear and above and below is favorable.

According to the embodiment, since the primary balancer 815 for suppression of vibrations caused by a primary inertial force is arranged above the virtual horizontal plane F, which includes the crank axis P, weight balance relative to the starter motor 850, which is arranged below the virtual horizontal plane F, is favorable.

Also, since the primary balancer 815 is arranged on an opposite side of the virtual plane C, which includes the crank axis P and is perpendicular to the cylinder axis B, to the cylinder block 823 as viewed in the direction along the crankshaft, the primary balancer 815 will be positioned on an opposite side of the virtual plane C to the ECVT motor 865, so that weight balance in the front and the rear of the crankshaft 821 is favorable.

According to the embodiment, since the stopper surface 822c', against which the cushioning member 884 of the main stand 883 abuts to thereby hold the main stand 883 in the storage position, is formed on the lower surface of the oil reservoir 822c, it is possible to suppress variation in height of the main stand 883 from a road surface, which is caused by vertical swinging of the power unit 810.

Also, since the starter motor 850 is positioned above the lower end of the stopper surface 822c', it is possible to restrict contact of the starter motor 850 with an outside to the minimum.

In addition, while the starter motor 850 is arranged on the rear wall of the oil reservoir portion 822c in the embodiment, a starter motor 850' may be arranged adjacent to a front wall (see two-dot chain lines in FIG. 3) of the oil reservoir portion 822c, or adjacent to the left and right side walls thereof in the invention. Also, in such case, it is possible to arrange the ECVT motor 865 without oversizing of the power unit 810, thus producing substantially the same effect as that in the embodiment.

Also, while the embodiment has been described taking a unit swing type power unit as an example, the invention is applicable to a rigid type power unit fixed to a vehicle body frame.

Further, while the embodiment has been described taking a power unit, in which a cylinder body is arranged with a cylinder axis B being substantially horizontal, as an example, the invention is also applicable to the case where an angle formed by a cylinder axis B is 10 to 45 degrees, or 45 degrees or more.

Also, while the embodiment has been described with respect to a power unit of a scooter type motorcycle, the power unit of the invention is not limited to a scooter type one but applicable to other motorcycles. Also, "motorcycle" referred to in this application means a motorcycle including a bicycle with a prime mover (motorbicycle) and a scooter, and specifically means a vehicle capable of turning while a vehicle body inclines. Accordingly, even a three-wheeler, four-wheeler (or more) in terms of the number of tires, in which one of a front wheel and a rear wheel includes two or more wheels, can be included in "motorcycle" referred to in this application. Furthermore, the invention is not limited to a motorcycle but applicable to other vehicles capable of making use of an effect of the invention, for example, a so-called saddle-ride type vehicle including a four-wheel buggy (ATV: All-Terrain Vehicle) and a snowmobile other than a motorcycle.

The particular embodiments of the invention described in this document should be considered illustrative, rather than restrictive. Modification to the described embodiments may be made without departing from the spirit of the invention as defined by the following claims.

The invention claimed is:

1. A power unit, in which an engine body having a crankshaft and a transmission casing accommodating therein a V-belt type transmission are joined, the power unit comprising an oil reservoir portion formed on a bottom of the engine body to project downward from a lower edge of the transmission casing and an electric motor arranged adjacent to a side wall of the oil reservoir portion, wherein
    the V-belt type transmission has a drive side sheave and a driven side sheave driven by the drive side sheave, and
    the oil reservoir portion and the electric motor are positioned next to each other generally within a range between front and rear ends of the drive side sheave.

2. The power unit according to claim 1, wherein the transmission casing is arranged laterally of the engine body.

3. The power unit according to claim 2, wherein an upper portion of the electric motor is arranged above the lower edge of the transmission casing.

4. The power unit according to claim 1, wherein the electric motor is arranged between an outer edge of a rear wheel supported on a rear end of the transmission casing and the oil reservoir portion.

5. The power unit according to claim 1, wherein the electric motor is arranged so that a lower edge thereof is positioned above a lowermost end of a lower edge of the oil reservoir portion.

6. The power unit according to claim 1, wherein the electric motor is a starter motor that rotationally drives the crankshaft.

7. The power unit according to claim 6, wherein the drive side sheave is arranged coaxially on one side of the crankshaft in a direction along the crankshaft, the driven side sheave is arranged on a side of a rear wheel, and a V-belt is wound around both sheaves, and an output gear of the starter motor is connected to a starter gear arranged on the other side of the crankshaft in the direction along the crankshaft.

8. The power unit according to claim 7, wherein the drive side sheave comprises a wound diameter varying mechanism that controls an effect wound diameter of the drive side sheave to any diameter by means of rotation of a control motor, and a rotating gear of the control motor meshes with power transmission gear, which is arranged on a side of the drive side sheave and on the other side of the crankshaft in the direction along the crankshaft.

9. The power unit according to claim 8, wherein the control motor is arranged above a virtual horizontal plane including a crank axis.

10. The power unit according to claim 1, further comprising a primary balancer to suppress vibrations caused by a primary inertial force, the primary balancer being arranged above a virtual horizontal plane including a crank axis.

11. A saddle-ride type vehicle comprising a vehicle body frame and the power unit according to claim 1 mounted on the vehicle body frame so that the crankshaft is directed in a left and right direction of the vehicle.

12. The saddle-ride type vehicle according to claim 11, wherein a main stand is supported on the vehicle body frame to be able to swing between an upright position, in which a vehicle body is supported, and a storage position, in which it abuts against the power unit, formed on a bottom surface of the oil reservoir portion is a stopper surface, against which the main stand abuts to thereby be held in the storage position, and the electric motor is arranged so that a lower edge thereof is positioned above a lower edge of the stopper surface.

13. A power unit, in which an engine body having a crankshaft and a transmission casing accommodating therein a V-belt type transmission are joined, the power unit comprising an oil reservoir portion formed on a bottom of the engine body to project downward from a lower edge of the transmission casing and an electric motor arranged adjacent to the oil reservoir portion, wherein
    the V-belt type transmission has a drive side sheave and a driven side sheave driven by the drive side sheave, and
    the oil reservoir portion and the electric motor are positioned next to each other generally within a range between front and rear ends of the drive side sheave.

* * * * *

UNITED STATES PATENT AND TRADEMARK OFFICE
CERTIFICATE OF CORRECTION

PATENT NO. : 7,610,987 B2
APPLICATION NO. : 11/478847
DATED : November 3, 2009
INVENTOR(S) : Atsushi Aoyama It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this

Twelfth Day of October, 2010

David J. Kappos
*Director of the United States Patent and Trademark Office*